No. 876,901. PATENTED JAN. 14, 1908.
C. A. ERNST & G. O. HAMLIN.
PROCESS OF FILTERING VISCOSE AND SIMILAR VISCOUS SUBSTANCES.
APPLICATION FILED MAY 11, 1907.
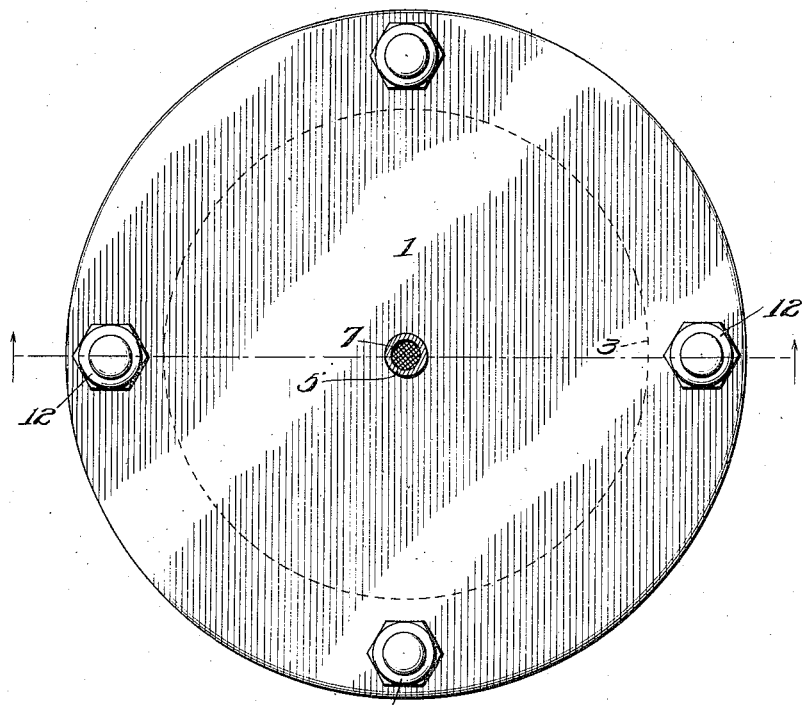
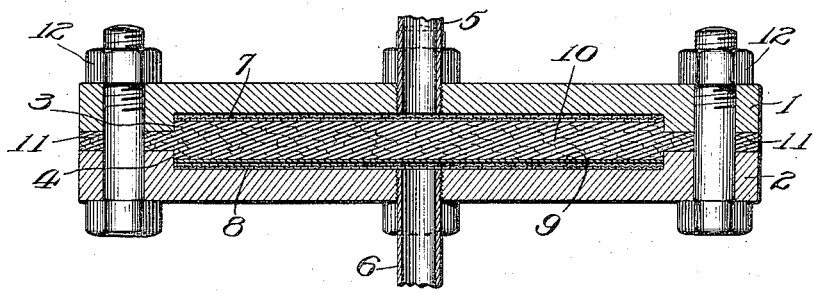
INVENTORS
Charles A. Ernst and
George O. Hamlin.
WITNESSES
BY
ATTORNEY

UNITED STATES PATENT OFFICE.

CHARLES A. ERNST AND GEORGE O. HAMLIN, OF LANSDOWNE, PENNSYLVANIA, ASSIGNORS TO SILAS W. PETTIT, OF PHILADELPHIA, PENNSYLVANIA.

PROCESS OF FILTERING VISCOSE AND SIMILAR VISCOUS SUBSTANCES.

No. 876,901.        Specification of Letters Patent.        Patented Jan. 14, 1908.

Original application filed April 24, 1905. Serial No. 257,100. Divided and this application filed May 11, 1907. Serial No. 373,031.

*To all whom it may concern:*

Be it known that we, CHARLES A. ERNST and GEORGE O. HAMLIN, both of Lansdowne, county of Delaware, State of Pennsylvania, have invented certain new and useful Improvements in the Process of Filtering Viscose and Similar Viscous Substances, of which the following is a full, clear, and complete disclosure, this application being a division of our application for United States patent, filed April 24, 1905, Serial No. 257,100.

The object of our invention is to quickly and efficiently remove plastic, gelatinous, or other impurities from viscose and other viscous substances.

In ordinary filters in which cloth, cotton, cotton wool, or glass wool is packed in the ordinary manner, the plastic or gelatinous impurities are contorted or compressed to such an extent that they are squeezed through the pores or interstices between the fibers of the filtering material although such pores or interstices may be smaller in diameter than the normal size of the impurities. We have found this to be the case with gelatinous particles contained in viscose, made according to the methods known at the present time, and particularly in accordance with U. S. Patent, No. 716,778, issued December 23, 1902, to Charles H. Sterns. We have found that by compressing the filtering material so that the pores or interstices between fibers of the same are made somewhat smaller, and said fibers more firmly and definitely located within the body of the filtering material, which is done by subjecting the filtering material to external pressure, the gelatinous particles are prevented from moving or dislocating the fibers of the filtering material, as is the case when said material is not under external pressure, that is, not under pressure greater than that sufficient to force the viscose itself through the filter. Furthermore, if the material of the filter is not subjected to auxiliary or external pressure greater than that to which the viscose itself is subjected, the fibers of the cotton or glass wool will, in a measure, have a tendency to float in the viscose, and thus be not firmly located so as to interrupt the passage of the gelatinous particles therethrough. According to our invention, however, the external pressure fixes the spaces or pores between the fibers of the filter material so that said fibers are not pushed aside to allow the passage of the impurities, and the spaces between said fibers are maintained in much more constant and fixed diameter than heretofore, said pores also being considerably more reduced in diameter than when not subjected to external pressure.

For a full, clear, and exact description of one form of apparatus for carrying out our improved process, reference may be had to the following specification, and to the accompanying drawing forming a part thereof, in which Figure 1 is a plan view of one form of a suitable filter; and Fig. 2 is a transverse sectional view thereof.

Referring to the drawings, the numeral 1 indicates the upper plate or casing of the filter, and the numeral 2 the lower plate or casing thereof. These plates are provided on their inner faces with shallow circular recesses, as indicated at 3 and 4, which recesses communicate respectively with inlet and outlet pipes 5 and 6 respectively, placed at any convenient point, but preferably at the center of the plates. Adjacent the surface of the recess 3, we place a piece of wire gauze, or other suitable stiff woven material, 7, having a series of meshes therein, and also on the surface of the recess 4, a similar piece of wire gauze is indicated at 8. Upon the wire gauze 8, we preferably place a piece of cloth 9, which is sufficiently meshed to prevent the filtering material from passing therethrough, and for allowing the viscose to easily pass. Between this cloth 9 and the upper gauze 7, we place the filtering material, as indicated at 10, said filtering material consisting of any suitable substance, such as cotton or glass wool, and one form of material which we have found to be successful is surgeons' cotton. This filtering material 10 is placed not only within the recesses, but extends outwardly between the flanges formed by said recesses, as indicated at 11. This filtering material, before the same is compressed, is placed in position to a depth or thickness of approximately three inches, and pressure is then put upon the same, so that the filtering material will be under a pressure greater than that to which the viscose is subjected, the pressure being somewhat varied according to the circumstances and condition of the viscose. As means for producing this pressure, we provide any well known clamping devices, in this instance indicated as bolts 12, passing through the flanges formed by the recesses 3 and 4, at suitable intervals.

It will now be noticed that when the filtering material is clamped between the flanges, as well as between the recesses in the plates, considerably more pressure is brought upon the filtering material between said flanges, thereby forming a packing which prevents the viscose, or material to be filtered, from passing laterally out of the filter, for, of course, the material being filtered takes the lines of least resistance, in passing through the filter, and, therefore, remains in the filtering material under less pressure. It will be noticed that the plates of gauze, 7 and 8, provide spaces or passages by which the viscose or other material to be filtered may pass over the entire upper surface of the filtering material and may be withdrawn from the entire lower surface thereof, thus causing the filter to act uniformly and evenly throughout its entire body. Instead of the use of wire gauze as indicated by the numerals 7 and 8, plates of corrugated sheet metal, provided with openings and narrow channels or grooves arranged either radially or circularly, may be used, but such grooves must necessarily be narrow in order to prevent cotton from being pressed into them and thus obstructing the free passage laterally of the viscose.

It will be evident that the thickness of the filtering material or cotton may be varied according to the different requirements, and also that the depth of the recesses in the plates 1 and 2 may also be varied to suit the requirements of pressure of filtration required.

Having thus described our invention, it will be obvious that changes may be made in the form, arrangement and proportion of the apparatus without departing from the spirit and scope of our invention, since the process may be carried out in a variety of ways depending to some extent upon the different kinds of material to be filtered.

What we claim and desire to protect by Letters Patent of the United States, is:

1. The method of filtering viscose and similar viscous substances, which consists in forcing the same, under pressure, through a filtering body which is subjected to a greater pressure than that to which the substance being filtered is subjected.

2. The method of filtering viscose and similar viscous substances, which consists in forcing the same, under pressure, through a filtering body which is subjected to a mechanical pressure independent of and greater than that to which the material being filtered is subjected.

3. The method of filtering viscose and similar viscous substances, which consists in forcing the substance being filtered through a fibrous filtering body, such filtering body being subjected to a pressure independent of and greater than that to which the material being filtered is subjected.

4. The method of filtering viscose and similar viscous substances, which consists in forcing the fibers of a fibrous filtering body into close contact with each other and holding the fibers substantially immovable with respect to each other, by subjecting the said filtering body to external pressure and then forcing the viscose through said body under pressure less than that to which the filtering body is subjected.

In witness whereof we have hereunto set our hands this tenth day of May, 1907.

CHARLES A. ERNST.
GEORGE O. HAMLIN.

Witnesses:
ALSTON B. MOULTON,
ALEXANDER PARK.